(12) United States Patent
Sodagar

(10) Patent No.: US 12,052,693 B2
(45) Date of Patent: Jul. 30, 2024

(54) METHOD AND APPARATUS FOR DEFINING EGEST CONFIGURATION AND PROTOCOLS IN 5G UPLINK STREAMING

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 168 days.

(21) Appl. No.: 17/497,009

(22) Filed: Oct. 8, 2021

(65) Prior Publication Data

US 2022/0322306 A1 Oct. 6, 2022

Related U.S. Application Data

(60) Provisional application No. 63/168,956, filed on Mar. 31, 2021.

(51) Int. Cl.
*H04W 72/04* (2023.01)
(52) U.S. Cl.
CPC .................................. *H04W 72/04* (2013.01)
(58) Field of Classification Search
CPC .... H04W 72/04; H04L 65/75; H04L 65/1013; H04L 65/1033; H04L 65/60; H04L 65/1069; H04L 67/02; H04L 67/63; H04N 21/2343; H04N 21/218; H04N 21/2393; H04N 21/643
See application file for complete search history.

(56) References Cited

U.S. PATENT DOCUMENTS

| | | | |
|---|---|---|---|
| 2020/0228880 A1 | 7/2020 | Iyer et al. | |
| 2022/0303616 A1* | 9/2022 | Sodagar | H04L 65/1069 |
| 2022/0322323 A1* | 10/2022 | Sodagar | H04W 72/20 |
| 2022/0368753 A1* | 11/2022 | Sodagar | H04L 65/752 |

FOREIGN PATENT DOCUMENTS

CN 112217812 A 1/2021

OTHER PUBLICATIONS

3GPP TS 26.512 version 16.1.0 Release 16, "5G; 5G Media Streaming (5GMS); Protocols", Jan. 19, 2021. Retrieved on May 19, 2023 from <https://www.etsi.org/deliver/etsi_ts/126500_126599/126512/16.01.00_60/ts_126512v160100p.pdf> (Year: 2021).*

(Continued)

*Primary Examiner* — Shean Tokuta
*Assistant Examiner* — Juan C Turriate Gastulo
(74) *Attorney, Agent, or Firm* — Sughrue Mion, PLLC

(57) ABSTRACT

A method of a 5th Generation media streaming uplink (5GMSu) application function (AF) is provided. The method includes receiving, from a 5GMSu application provider, a first request to create a content egest template (CET), creating the CET based on the first request received from the 5GMSu application provider, transmitting, to a 5GMSu application server (AS), a second request to allocate content resources for egest based on the created CET, transmitting, to the 5GMSu application provider, an acknowledgement that the CET is created.

20 Claims, 7 Drawing Sheets

(56) References Cited

OTHER PUBLICATIONS

3GPP TR 26.804 version 0.1 Release 17, "3rd Generation Partnership Project; Technical Specification Group Services and System Aspects; Study on 5G Media Streaming Extension", Mar. 29, 2021. Retrieved on May 19, 2023 from <https://www.3gpp.org/ftp/TSG_SA/WG4_CODEC/TSGS4_113-e/Inbox/Drafts/MBS/> (Year: 2021).*
"3rd Generation Partnership Project; Technical Specification Group Services and System Aspects; 5G Media Streaming (5GMS); Protocols (Release 16)", 3GPP TS 26.512 V16.2.0, Apr. 2021 (47 pages total).
International Search Report dated Jan. 26, 2022 from the International Searching Authority in International Application No. PCT/US2021/054743.
Written Opinion dated Jan. 26, 2022 from the International Searching Authority in International Application No. PCT/US2021/054743.
"3rd Generation Partnership Project; Technical Specification Group Services and System Aspects; 5G Media Streaming (5GMS); Protocols (Release 16)", 3GPP TS 26.512 V16.1.0, Dec. 2020, 96pages.
"3rd Generation Partnership Project; Technical Group Services and System Aspects; 5G Media Streaming (5GMS); General description and architecture (Release 16)", 3GPP TS 26.501 V16.6.1, Jan. 2021, 79pages.
Extended European Search Report issued Mar. 1, 2023 in European Application No. 21925117.0.
Tencent, "[FS_5GMS-EXT] Updated text for Content Preparation", F3GPP TSG SA WG4 MBS SWG post 112-e, S4al201154, 2021 (15 pages total).

* cited by examiner

METHOD AND APPARATUS FOR DEFINING EGEST CONFIGURATION AND PROTOCOLS IN 5G UPLINK STREAMING

CROSS-REFERENCE TO RELATED APPLICATION

This application claims priority from U.S. Provisional Application No. 63/168,956, filed on Mar. 31, 2021, in the United States Patent and Trademark Office, the disclosure of which is incorporated herein by reference in its entirety.

FIELD

The disclosure generally relates to $5^{th}$ generation (5G) uplink streaming, and, in particular, to a method and apparatus for defining and signaling an egest configuration and egest protocols in 5G uplink streaming.

BACKGROUND

The 3rd Generation Partnership Project (3GPP) TS26.512 defines the concept of uplink streaming where the content is streamed from a device to an external service provider. However, the existing streaming architecture only defines the general architecture for uplink and downlink media streaming. There is no definition of egest protocols or egest configurations.

SUMMARY

In accordance with an aspect of the disclosure, a method of a $5^{th}$ Generation media streaming uplink (5GMSu) application function (AF) is provided. The method may include receiving, from a 5GMSu application provider, a request to create a content egest template (CET), creating the CET based on the first request received from the 5GMSu application provider, transmitting, to a 5GMSu application server (AS), a second request to allocate content resources for egest based on the created CET, transmitting, to the 5GMSu application provider, an acknowledgement that the CET is created.

In accordance with an aspect of the disclosure, a device is provided. The device may include at least one memory configured to store program code, and at least one processor configured to read the program code and operate as instructed by the program code, the program code including first receiving code configured to cause the at least one processor to receive, at a 5GMSu AF and from a 5GMSu application provider, a first request to create a CET, first creating code configured to cause the at least one processor to create the CET based on the first request received from the 5GMSu application provider, first transmitting code configured to cause the at least one processor to transmit, to a 5GMSu AS, a second request to allocate content resources for egest based on the created CET, and second transmitting code configured to cause the at least one processor to transmit, to the 5GMSu application provider, an acknowledgement that the CET is created.

According to an aspect of the disclosure, a non-transitory computer-readable storage medium is provided. The non-transitory computer-readable medium may store instructions, the instructions including one or more instructions that, when executed by one or more processors of a device, cause the one or more processors to receive, at a 5GMSu AF and from a 5GMSu application provider, a first request to create a CET, create the CET based on the first request received from the 5GMSu application provider, transmit, to a 5GMSu AS, a second request to allocate content resources for egest based on the created CET, and transmit, to the 5GMSu application provider, an acknowledgement that the CET is created.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
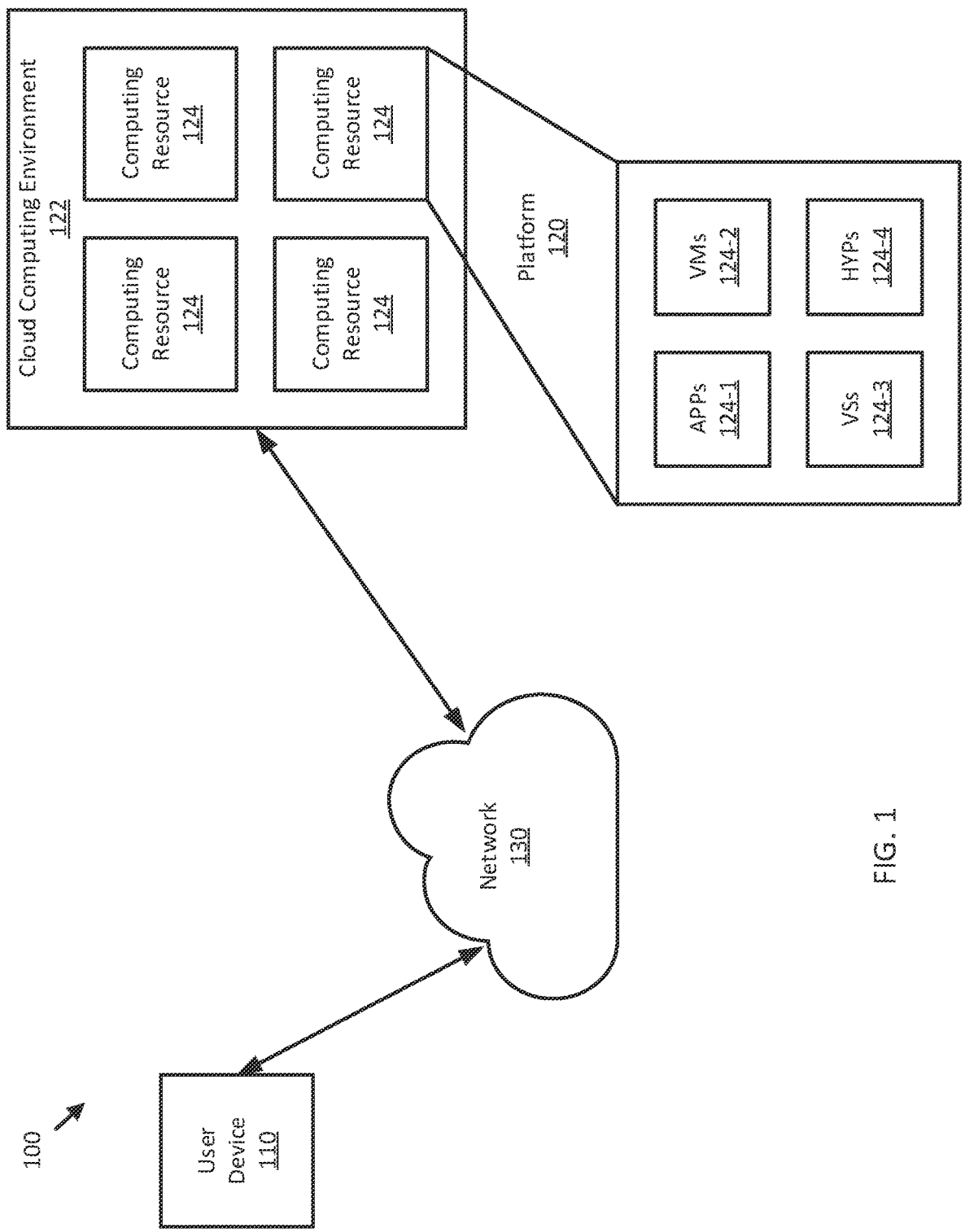
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
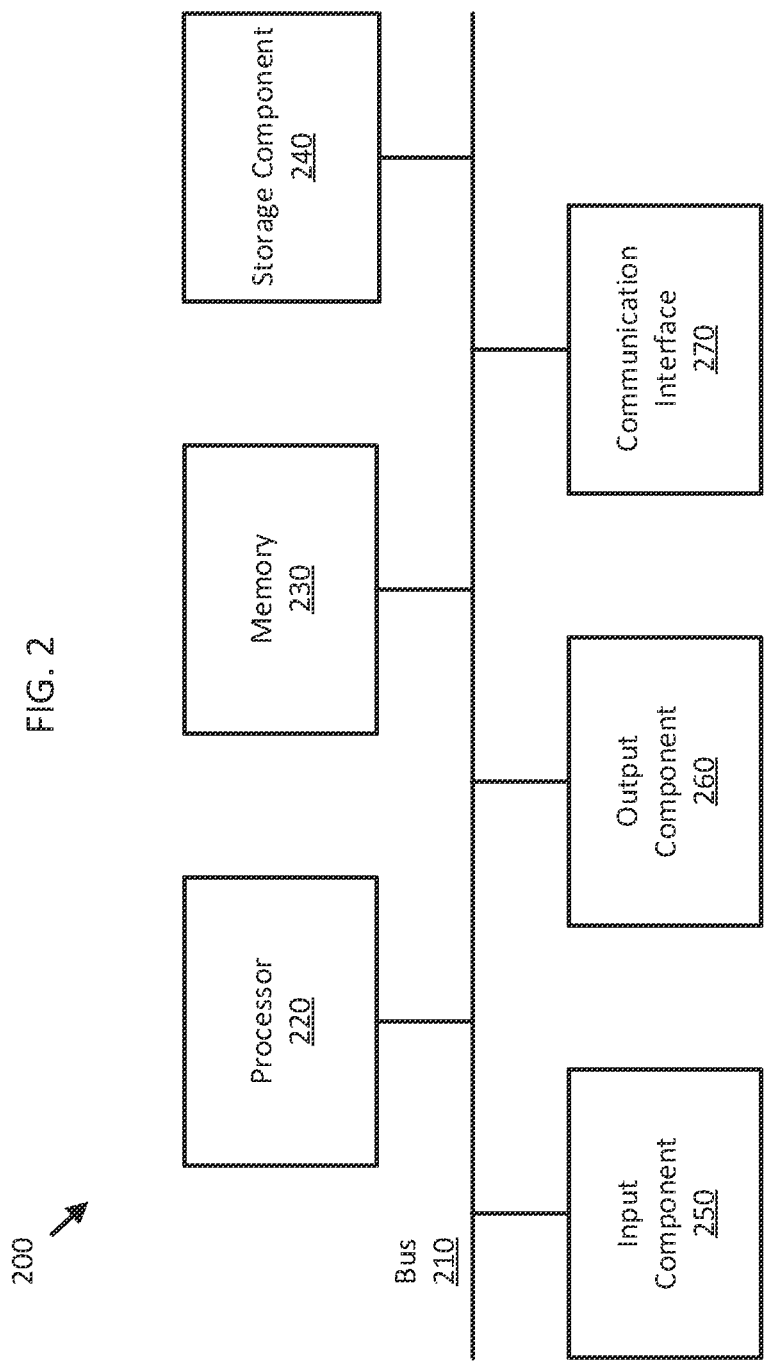
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mid) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
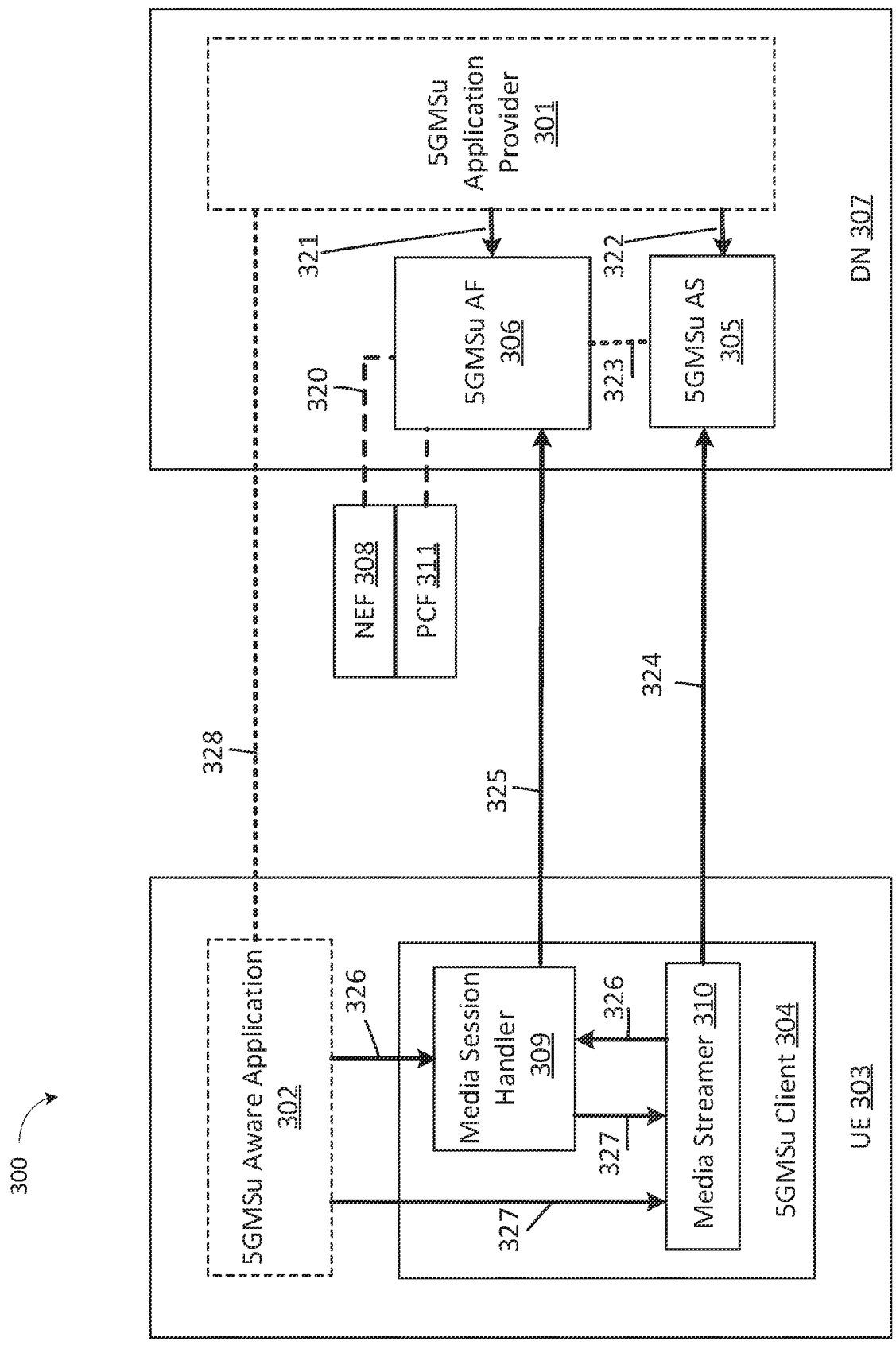
FIG. 3 is a block diagram of a media architecture for media uplink streaming, according to embodiments.

FIG. 3 is a diagram of a media architecture 300 for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 30) to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
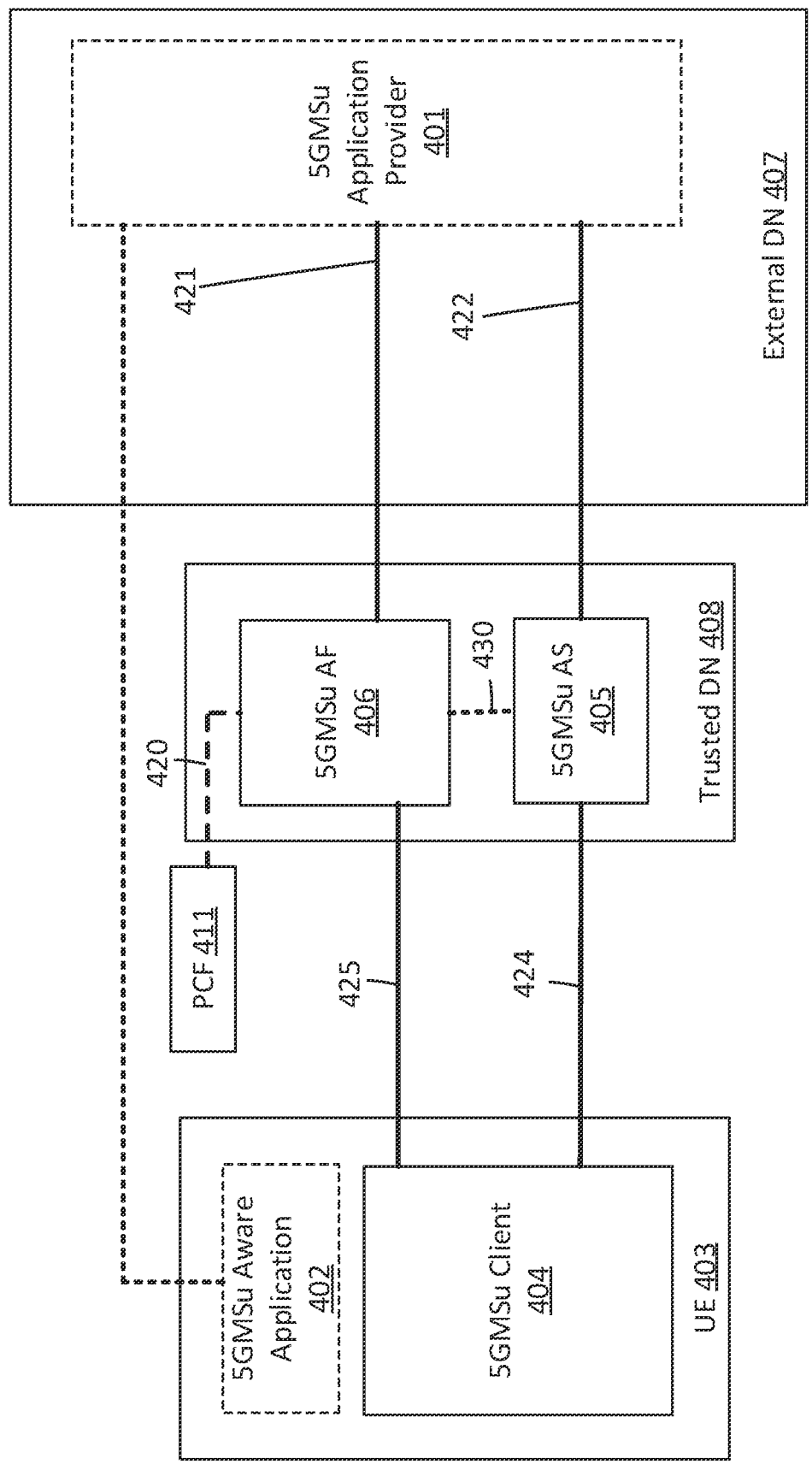
FIG. 4 is a diagram of a media architecture for content preparation after uplink ingest streaming, according to embodiments.

FIG. 4 is a diagram of a media architecture 400 for content preparation after uplink ingest streaming, according to embodiments. The media architecture 400 includes a UE 403, an external DN 407 and a trusted DN 408. The UE 403 includes a 5GMSu Aware Application 402 and a 5GMSu client 404. The external DN 407 includes a 5GMSu Application Provider 401. The trusted DN 408 includes a 5GMSu AS 405 and a 5GMSu AF 406. The 5GMSu AF 406 may relay or initiate a request for different PCF 411 treatment or interact with other network functions via an N5 link 420.

FIG. 4 depicts a scenario where the 5GMSu Application Provider 401 or the 5GMSu Aware Application 402 requests content preparation for an uplink ingest stream and delivery to the 5GMSu Application Provider 401. As such, the 5GMSu Application Provider 401 may interface with the 5GMSu AF 406 by an M1u link 421, may interface with the 5GMSu AS 405 by an M2u link 422, and may interface with the 5GMSu Aware Application 402 by an M8u link 428. Furthermore, the 5GMSu client 404 may interface with the 5GMSu AS 405 by an M4u link 424 and may interface with the 5GMSu AF 406 by an M5u link 425. The 5GMSu AS 405 may interface with the 5GMSu AF 406 by an M3u link 430. The M3u link 430 may include an internal API between the 5GMSu AF 406 and the 5GMSU AS 405 that is used to exchange information for content hosting on the 5GMSu AS 405 within the trusted DN 408. The 5GMSu AS 405 may include an application server dedicated to 5G uplink media streaming.

According to embodiments, the 5GMSu Application Provider 401 may create a provisioning session with the 5GMSu AF 406 using, for example, the M1u link 421. The 5GMSu Application Provider 401 may request the 5GMSu AF 406 to create a content egest template (CET) that defines the instructions for content egest using, for example, the M1u link 421. Based on the received request to create the CET, the 5GMSu AF 405 may request the 5GMSu AS 406 to allocate content resources for egest using, for example, the M3u link 430. The 5GMSu AF 406 may acknowledge, to the 5GMSu Application Provider 401, the successful creation of the CET using, for example, the M1u link 421. Then, the 5GMSu Application Provider 401 may announce the availability of the services to the 5GMS Aware Application 402. The CET is added as a new resource in response to calls for the creation of it. The CET includes the information for setting up the egest by using the M2u link 422, as described in operation 544 below.

Figure 5A:
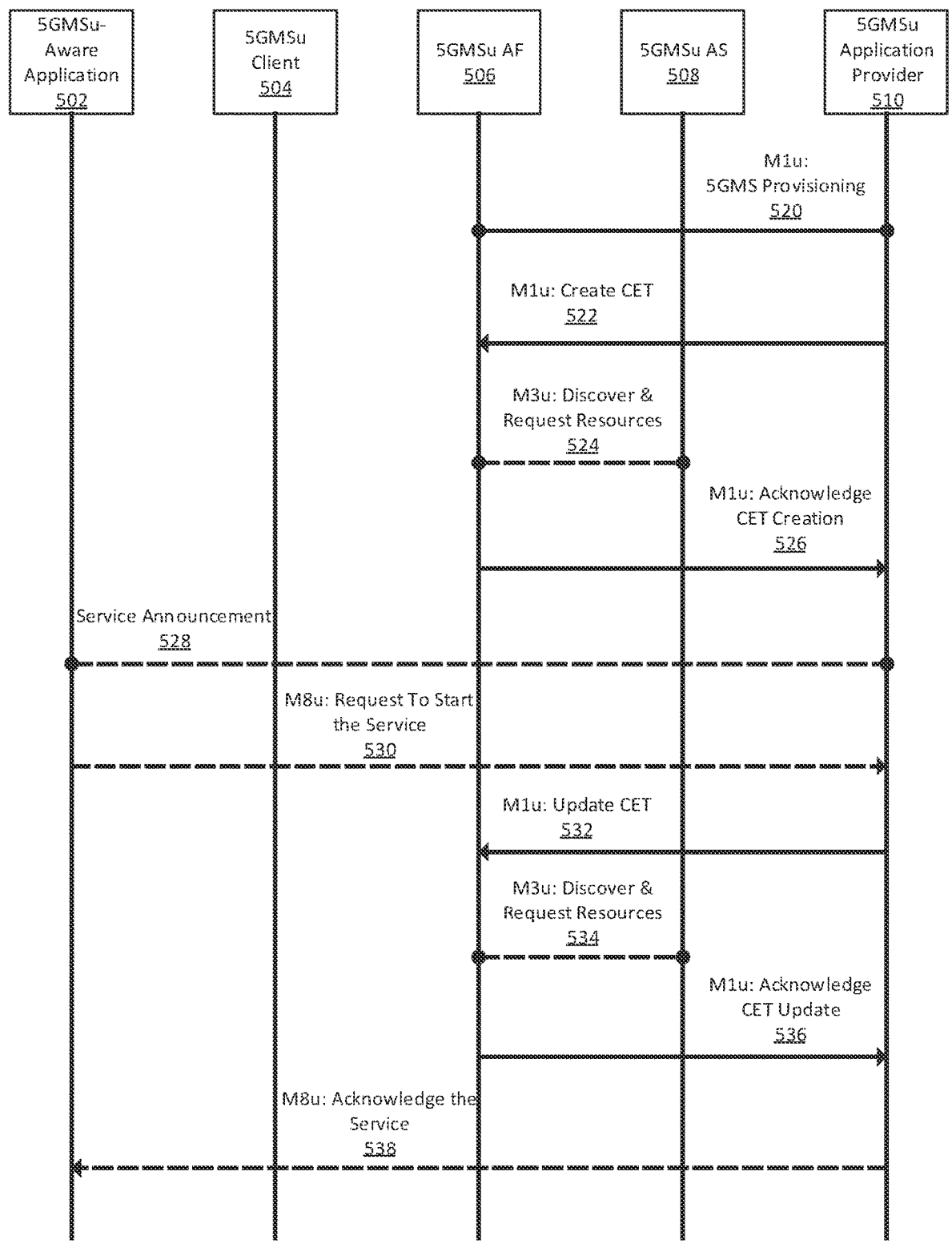
FIGS. 5A and 5B are diagrams of an operation flow for content preparation after uplink ingest streaming, according to embodiments.
Figure 5B:
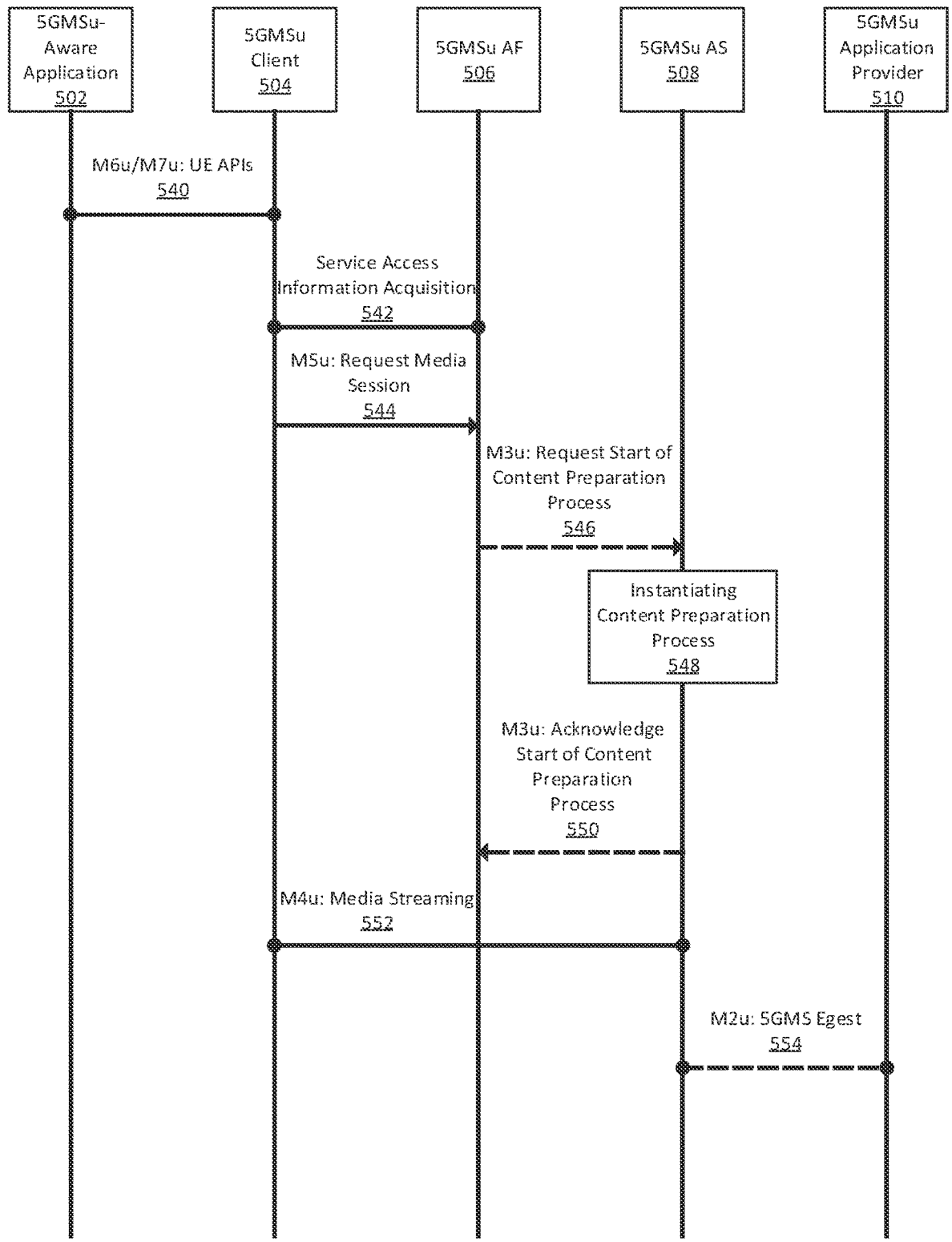

FIGS. 5A and 5B are diagrams of an operation flow for content preparation after uplink ingest streaming, according to an embodiment. The operation flow utilizes, for example, a 5GMSu Aware Application 502, a 5GMSu client 504, a 5GMSu AF 506, a 5GMSu AS 508, and a 5GMSu Application Provider 510.

In operation 520, the 5GMSu Application Provider 510 creates a provisioning session with the 5GMSu AF 506 using interface M1u. In operation 522, the 5GMSu Application Provider 510 transmits a request to the 5GMSu AF 506 to create a CET using interface M1u. In operation 524, the 5GMSu AF 506 discovers and requests, from the 5GMSu AS 508, resources to allocate for egest using the M3u interface. In operation 526, the 5GMSu AF 506 transmits an acknowledgement to the 5GMSu Application Provider 510 that the CET has been created, using the M1u interface. In operation 528, the 5GMSu Application Provider 510 provides a service announcement to the 5GMSu Aware Application 502 indicating availability of services. In operation 534, the 5GMSu AF 506 discovers and requests, from the 5GMSu AS 508, updated resources to allocate for egest using the M3u interface.

In operation 530, the 5GMSu Aware Application 502 transmits a request to start the service to the 5GMSu Application Provider 510 using the M8u interface. In operation 532, the 5GMSu Application Provider 510 sends a request to the 5GMSu AF 506 to update the CET, using interface M1u. In operation 536, the 5GMSu AF 506 transmits an acknowledgement to the 5GMSu Application Provider 510 that the CET has been updated, using the M1u interface. In operation 534, the 5GMSu Application Provider 510 acknowledges the service to the 5GMSu Aware Application 502, using the M8u interface.

In operation 540, the UE APIs are utilized from the 5GMSu client 504. In operation 542, the 5GMSu AF 506 performs service access information acquisition from the 5GMSu client 504. In operation 544, the 5GMSu client 504 transmits a request for a media session to the 5GMSu AF 506, using the M5u interface. In operation 546, the 5GMSu AF 506 transmits a request to start the content preparation process to the 5GMSu AS 508, using the M3u interface. In operation 548, the 5GMSu AS 508 performs the instantiating content preparation process. In operation 550, the 5GMSu AS 508 transmits an acknowledgement to the 5GMSu AF 506 indicating the start of the content preparation process, using the M3u link. In operation 552, media streaming is performed between the 5GMSu AS 508 and the 5GMSu client 504, using the M4u interface. In operation 554, the 5GMS egest is performed between the 5GMSu Application Provider 510 and the 5GMSu AS 508, using the M2u interface.

For the content egest protocols, the hyper-text transfer protocol (HTTP) pull-based content ingest protocol as well as the DASH-IF push-based content ingest protocol are added to be used for egest. Table 1 shows supported egest content protocols.

TABLE 1

| Description | Term identifier | Clause |
|---|---|---|
| Content ingest protocols at a downlink interface | | |
| HTTP pull-based content ingest protocol | urn:3gpp:5gms:content-protocol:http-pull-ingest | 8.2 |

TABLE 1-continued

| Description | Term identifier | Clause |
|---|---|---|
| DASH-IF push-based content ingest protocol | urn:3gpp:5gms:content-protocol:dash-if-ingest | 8.3 |
| Content egest protocols at interface M2u | | |
| HTTP pull-based content ingest protocol | urn:3gpp:5gms:content-protocol:http-pull-ingest | 8.2 |
| DASH-IF push-based content ingest protocol | urn:3gpp:5gms:content-protocol:dash-if-ingest | 8.3 |

When using the HTTP pull-based content ingest protocol, since the content is pulled by the 5GMSu Application Provider from the 5GMSu's AS, the relative address of the media content may be provided through the M8u interface (i.e., the 5GMSu Aware Application provides the 5GMSu Application Provider a manifest that includes the relative content resource URL).

For the content egest configuration API, the API is defined for creation, update, access, and removal of the CET resource, shown in Table 2. Table 2 shows operations supported by the content egest configuration API.

TABLE 2

| Operation | Sub-resource path | Allowed HTTP method(s) | Description |
|---|---|---|---|
| Create Content Egest Configuration | contest-egest-configuration | POST | Used to create a Content Egest Configuration resource. |
| Retrieve Content Egest Configuration | | GET | Used to retrieve an existing Content Egest Configuration. |
| Update Content Egest Configuration | | PUT, PATCH | Used to modify an existing Content Egest Configuration. |
| Delete Content Egest Configuration | | DELETE | Used to delete an existing Content Egest Configuration. |
| Purge Content Egest Configuration cache | content-egest-configuration/purge | POST | This operation is used to invalidate some or all cached media resources associated with this Content Egest Configuration. |

The content egest configuration may be defined based on the CET. For the CET, the data model shown in Table 3 may be utilized.

| Property name | Data Type | Cardinality | Description |
|---|---|---|---|
| name | String | 1 . . . 1 | A name for this Content Egest Configuration. |
| EgestConfiguration | Object | 1 . . . 1 | Describes the 5GMSu Application Provider's origin server to which media resources will be egested via interface M2u. |

-continued

| Property name | Data Type | Cardinality | Description |
| --- | --- | --- | --- |
| path | String | 1 . . . 1 | The relative path which will be used to address the media resources at interface M2u. This path is provided by the 5GMSu AF in the case of pull-based egest. |
| pull | Boolean | 1 . . . 1 | Indicates whether the 5GMSu AS may use Pull or Push for egesting the content. |
| protocol | URI String | 1 . . . 1 | A fully-qualified term identifier allocated in the name space urn:3gpp:5gms:content-protocol that identifies the content ingest protocol. The set of supported protocols is defined in Table 2. |
| entryPoint | String | 1 . . . 1 | An entry point to egest the content. The semantics of the entry point are dependent on the selected egest protocol. In the case of Pull ingest (pull flag is set to True), this parameter is returned by the 5GMSu AF to the 5GMSu Application Provider and indicates the entry point for pulling the content. In this case, the entryPoint may be used as the base URL. In case of Push (pull flag is set to false), the entryPoint may be provided to the 5GMSu AF to indicate the location to which content is to be pushed. In this case, the entryPoint shall be used as the base URL. |
| UploadConfigurations | Object | 1 . . . 1 | Specifies content preparation for the egested content. |
| contentPreparationTemplateId | String | 0 . . . 1 | Indicates that content preparation prior to egest. |
| canonicalDomainName | String | 1 . . . 1 | All resources of the upload may be accessible through this default frequency domain name (FQDN) assigned by the 5GMSu AF. |
| certificateId | String | 0 . . . 1 | When content is distributed using TLS, the X.509 certificate for the origin domain is shared with the 5GMSd AF so that it can be presented by the 5GMSd AS in the TLS handshake at M2d. This attribute indicates the identifier of the certificate to use. |

Figure 6:
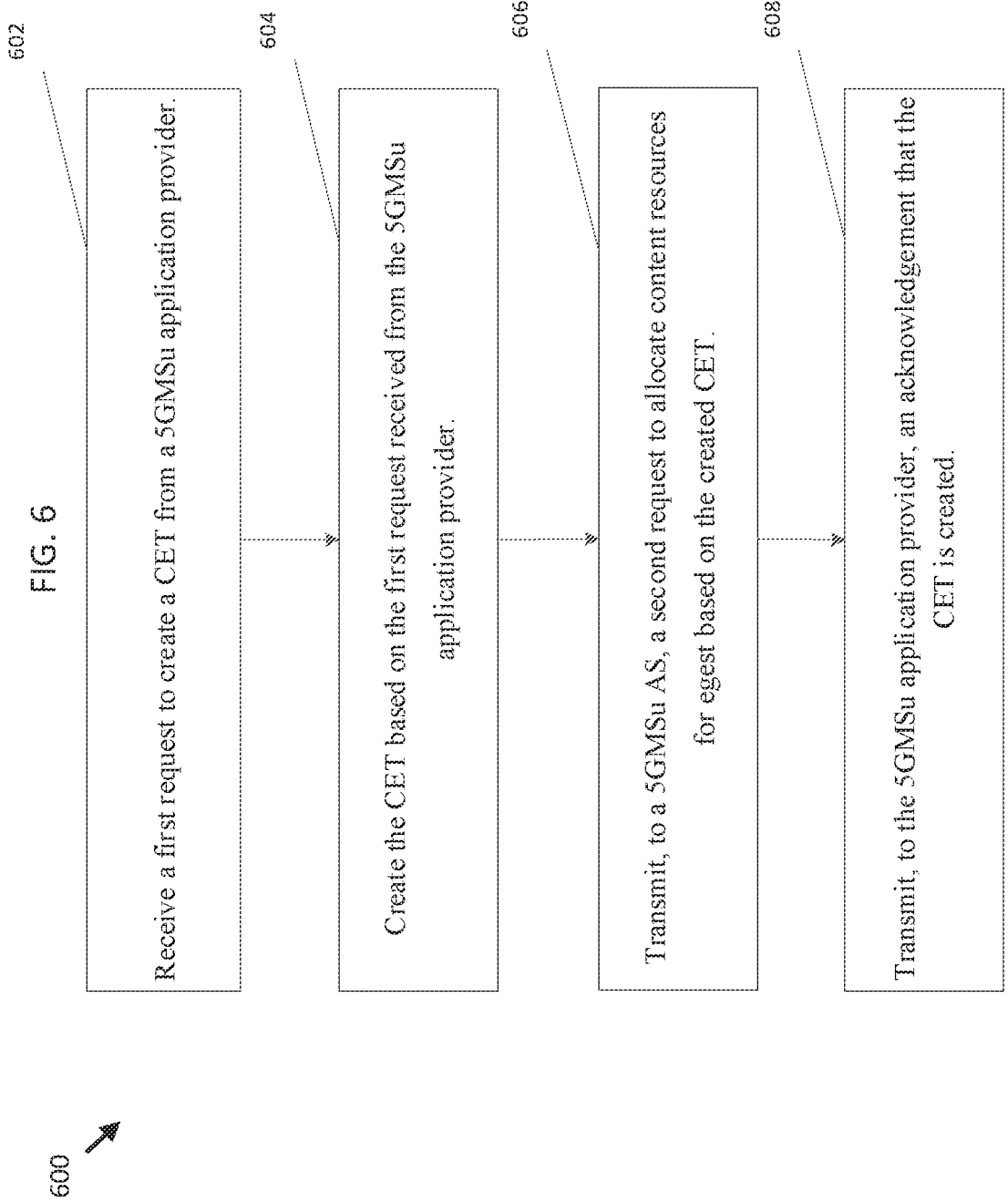
FIG. 6 is a flowchart of a process for content preparation after uplink ingest streaming, according to embodiments.

FIG. 6 is a flowchart of a process 600 for content preparation after uplink ingest streaming, according to embodiments. In operation 602, a 5GMSu AF receives a first request to create a CET from a 5GMSu Application Provider. In operation 604, the 5GMSu AF creates the CET based on the first request received from the 5GMSu application provider. In operation 606, the 5GMSu AF transmits, to a 5GMSu AS, a second request to allocate content resources for egest based on the created CET. In operation 608, the 5GMSu AF transmits, to the 5GMSu Application Provider, an acknowledgement that the CET is created.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of a 5th Generation media streaming uplink (5GMSu) application function (AF), the method comprising:
   receiving, from a 5GMSu application provider, a first request to create a content egest template (CET) comprising an ""HTTP pull-based content ingest protocol" as a first content egest protocol at an M2u API, and a "DASH-IF push-based content ingest protocol" as a second content egest protocol at the M2u API;
   creating the CET based on the first request received from the 5GMSu application provider;
   transmitting, to a 5GMSu application server (AS), a second request to allocate content resources for egest based on the created CET; and
   transmitting, to the 5GMSu application provider, an acknowledgement that the CET is created.

2. The method of claim 1, further comprising creating a content egest configuration based on the created CET.

3. The method of claim 2, wherein the content egest configuration includes at least one of an egest path, egest pull, egest protocol or an egest entry point.

4. The method of claim 3, wherein the egest protocol includes a hyper-text transfer protocol (HTTP) pull-based content ingest protocol and a DASH-IF push-based content ingest protocol.

5. The method of claim 1, wherein the transmitting the second request to allocate the content resources is performed with an interface between the 5GMSu AS and the 5GMSu AF.

6. The method of claim 1, wherein the CET defines at least one application programming interface for creating, updating, accessing and removing the CET,
   wherein the first request is received from the 5GMSu application provider by a 5GMSu application function and through an M1u interface,
   wherein the second request is transmitted through an M3u interface, and
   wherein the acknowledgement is transmitted through the M1u interface.

7. The method of claim 1, further comprising:
   receiving, from the 5GMSu application provider, a third request to update the CET; and
   updating the CET based on the received third request to update the CET.

8. A device, comprising:
   at least one memory configured to store program code; and
   at least one processor configured to read the program code and operate as instructed by the program code, the program code including:
      first receiving code configured to cause the at least one processor to receive, at a 5th Generation media streaming uplink (5GMSu) application function (AF) and from a 5GMSu application provider, a first request to create a content egest template (CET) comprising comprises an ""HTTP pull-based content ingest protocol" as a first content egest protocol at an M2u API, and a "DASH-IF push-based content ingest protocol" as a second content egest protocol at the M2u API;
      first creating code configured to cause the at least one processor to create the CET based on the first request received from the 5GMSu application provider;
      first transmitting code configured to cause the at least one processor to transmit, to a 5GMSu application server (AS), a second request to allocate content resources for egest based on the created CET; and
      second transmitting code configured to cause the at least one processor to transmit, to the 5GMSu application provider, an acknowledgement that the CET is created.

9. The device of claim 8, wherein the program code further includes second creating code configured to cause the at least one processor to create a content egest configuration based on the created CET.

10. The device of claim 9, wherein the content egest configuration includes at least one of an egest path, egest pull, egest protocol or an egest entry point.

11. The device of claim 10, wherein the egest protocol includes a hyper-text transfer protocol (HTTP) pull-based content ingest protocol and a DASH-IF push-based content ingest protocol.

12. The device of claim 8, wherein the transmitting the second request to allocate content resources of the first transmitting code is performed with an interface between the 5GMSu AS and the 5GMSu AF.

13. The device of claim 8, wherein the CET defines at least one application programming interface for creating, updating, accessing and removing the CET.

14. The device of claim 8, wherein the program code further includes:
   second receiving code configured to cause the at least one processor to receive, from the 5GMSu application provider, a third request to update the CET; and
   third receiving code configured to cause the at least one processor to update the CET based on the third received request to update the CET.

15. A non-transitory computer-readable medium storing instructions, the instructions comprising: one or more instructions that, when executed by one or more processors of a device, cause the one or more processors to:
   receive, at a 5th Generation media streaming uplink (5GMSu) application function (AF) and from a 5GMSu application provider, a first request to create a content egest template (CET) comprising an ""HTTP pull-based content ingest protocol" as a first content egest protocol at an M2u API, and a "DASH-IF push-based content ingest protocol" as a second content egest protocol at the M2u API;

create the CET based on the first request received from the 5GMSu application provider;

transmit, to a 5GMSu application server (AS), a second request to allocate content resources for egest based on the created CET; and transmit, to the 5GMSu application provider, an acknowledgement that the CET is created.

16. The non-transitory computer-readable medium of claim 15, wherein the instructions, when executed by the one or more processors, further cause the one or more processors to create a content egest configuration based on the created CET.

17. The non-transitory computer-readable medium of claim 16, wherein the content egest configuration includes at least one of an egest path, egest pull, egest protocol or an egest entry point.

18. The non-transitory computer-readable medium of claim 17, wherein the egest protocol includes a hyper-text transfer protocol (HTTP) pull-based content ingest protocol and a DASH-IF push-based content ingest protocol.

19. The non-transitory computer-readable medium of claim 15, wherein the transmitting the second request to allocate the content resources is performed with an interface between the 5GMSu AS and the 5GMSu AF.

20. The non-transitory computer-readable medium of claim 15, wherein the CET defines at least one application programming interface for creating, updating, accessing and removing the CET.

* * * * *